(12) United States Patent
Shimizu et al.

(10) Patent No.: US 12,717,352 B2
(45) Date of Patent: Aug. 25, 2026

(54) TRAVELING VEHICLE AND TRAVELING VEHICLE SYSTEM

(71) Applicant: MURATA MACHINERY, LTD., Kyoto (JP)

(72) Inventors: Yuji Shimizu, Ise (JP); Seiji Yamagami, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 136 days.

(21) Appl. No.: 18/286,488

(22) PCT Filed: Mar. 15, 2022

(86) PCT No.: PCT/JP2022/011558
§ 371 (c)(1),
(2) Date: Oct. 11, 2023

(87) PCT Pub. No.: WO2022/234723
PCT Pub. Date: Nov. 10, 2022

(65) Prior Publication Data

US 2024/0201707 A1 Jun. 20, 2024

(30) Foreign Application Priority Data

May 7, 2021 (JP) ................................ 2021-079171

(51) Int. Cl.
*G05D 1/69* (2024.01)
*G05D 1/244* (2024.01)
(Continued)

(52) U.S. Cl.
CPC ............. *G05D 1/69* (2024.01); *G05D 1/2446* (2024.01); *G06V 10/60* (2022.01); *G06V 20/58* (2022.01);
(Continued)

(58) Field of Classification Search
None
See application file for complete search history.

(56) References Cited

U.S. PATENT DOCUMENTS

2008/0030374 A1* 2/2008 Kumon .................. G08G 1/166 340/937
2019/0007142 A1* 1/2019 Kido .................... H04B 10/524
2021/0209318 A1* 7/2021 Fang ........................ G06K 7/10

FOREIGN PATENT DOCUMENTS

JP 62-296208 A 12/1987
JP 2000032082 A 1/2000
(Continued)

OTHER PUBLICATIONS

Official Communication issued in corresponding European Patent Application No. 22798830.0, mailed on Feb. 28, 2025, 7 pages.
(Continued)

*Primary Examiner* — Davin Seol
(74) *Attorney, Agent, or Firm* — Keating & Bennett, LLP

(57) ABSTRACT

A traveling vehicle is operable to travel along a predetermined travel path, and includes an indicator with switchable lighting states, an imager to capture an image of a preceding traveling vehicle located in front of a subject traveling vehicle to include the indicator provided to the preceding traveling vehicle in the captured image, and a controller to control traveling of the subject traveling vehicle based on a determination result of the lighting states of the indicator included in the captured image. The indicator includes a first indicator to notify a state of the subject traveling vehicle, and a second indicator to include both images of the indicator in a lit state and the indicator in an unlit state in the captured image.

6 Claims, 13 Drawing Sheets

(51) Int. Cl.
*G06V 10/60* (2022.01)
*G06V 20/58* (2022.01)
*G06V 30/224* (2022.01)
*G05D 105/20* (2024.01)
*G05D 107/70* (2024.01)
*G05D 111/10* (2024.01)

(52) U.S. Cl.
CPC ....... *G06V 30/224* (2022.01); *G05D 2105/20* (2024.01); *G05D 2107/70* (2024.01); *G05D 2111/17* (2024.01)

(56) References Cited

FOREIGN PATENT DOCUMENTS

JP 2001202497 A * 7/2001
JP 2016-012229 A 1/2016
KR 101971370 B1 * 8/2019

OTHER PUBLICATIONS

Takai et al., "Optical Vehicle-to-Vehicle Communication System Using LED Transmitter and Camera Receiver", IEEE Photonics Journal vol. 6, No. 5, Oct. 2014, 14 pages.
Chinnusamy et al., "Optimal Tracking of QR Inspired LEA Using Particle Filter for Secured Visual MIMO Communication Based Vehicular Network", Photonics vol. 6 No. 3, Aug. 24, 2019, pp. 1-24.
Official Communication issued in International Patent Application No. PCT/JP2022/011558, mailed on May 31, 2022.
Official Communication issued in International Patent Application No. PCT/JP2022/011558, mailed on Nov. 16, 2023.
English translation of Official Communication issued in International Patent Application No. PCT/JP2022/011558, mailed on May 31, 2022.

* cited by examiner

6(6A·6B)
18
TRAVELING UNIT
24
LATERAL FEED UNIT
26
θ DRIVE
28
ELEVATION DRIVER
30
ELEVATION UNIT
8
IMAGER
CONTROL UNIT
50
51
PATTERN RECOGNITION UNIT
53
INTER-VEHICLE DISTANCE DETERMINATION UNIT
55
INDICATOR CONTROL UNIT
57
LIGHTING STATE DETERMINATION UNIT
59
TRAVELING CONTROL UNIT
80
81(81A·81B)
FIRST INDICATOR
82(82A·82B)
SECOND INDICATOR
83(83A·83B)
THIRD INDICATOR
84(84A·84B)
FOURTH INDICATOR
85(85A·85B)
FIFTH INDICATOR

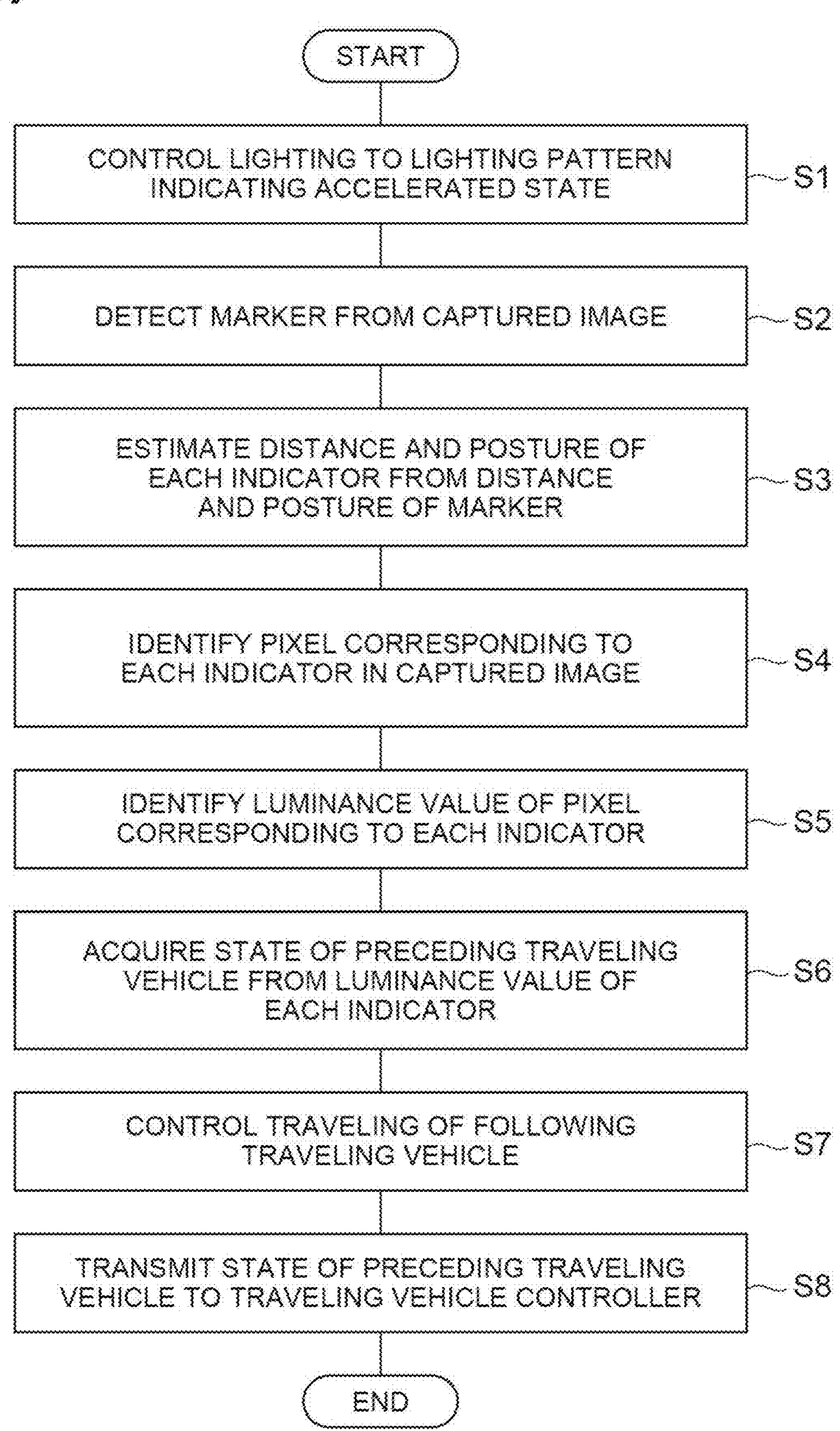
Fig.7
START
CONTROL LIGHTING TO LIGHTING PATTERN INDICATING ACCELERATED STATE
S1
DETECT MARKER FROM CAPTURED IMAGE
S2
ESTIMATE DISTANCE AND POSTURE OF EACH INDICATOR FROM DISTANCE AND POSTURE OF MARKER
S3
IDENTIFY PIXEL CORRESPONDING TO EACH INDICATOR IN CAPTURED IMAGE
S4
IDENTIFY LUMINANCE VALUE OF PIXEL CORRESPONDING TO EACH INDICATOR
S5
ACQUIRE STATE OF PRECEDING TRAVELING VEHICLE FROM LUMINANCE VALUE OF EACH INDICATOR
S6
CONTROL TRAVELING OF FOLLOWING TRAVELING VEHICLE
S7
TRANSMIT STATE OF PRECEDING TRAVELING VEHICLE TO TRAVELING VEHICLE CONTROLLER
S8
END

*Fig.12*

TRAVELING VEHICLE AND TRAVELING VEHICLE SYSTEM

BACKGROUND OF THE INVENTION

1. Field of the Invention

Aspects of the present invention relate to a traveling vehicle and a traveling vehicle system.

2. Description of the Related Art

For example, Japanese Unexamined Patent Publication No. S62-296208 discloses a travel control system for automatic guided vehicles. Specifically, each of the automatic guided vehicles in Japanese Unexamined Patent Publication No. S62-296208 includes a plurality of indication units (display lamps). The automatic guided vehicle determines the traveling information on another automatic guided vehicle and the information on the distance to the other automatic guided vehicle based on the lighting pattern of the indication units of the other automatic guided vehicle, and controls the traveling of the automatic guided vehicle itself based on such traveling information and distance information. The lighting states (a lit state or an unlit state) of the indication units are determined based on the luminance of the indication unit portion in an image captured by a camera.

SUMMARY OF THE INVENTION

For example, in an environment with high illumination or in a factory or the like where sunlight or the like partially enters, the indication units may be strongly irradiated with the illumination light or sunlight, and the above conventional determination method for the indication units may fail to properly determine the lighting states of the indication units.

Preferred embodiments of the present invention provide traveling vehicles and traveling vehicle systems each capable of accurately determining lighting states of an indicator in an environment influenced by disturbance light or the like.

A traveling vehicle according to an aspect of a preferred embodiment of the present invention is a traveling vehicle to travel along a predetermined travel path, the traveling vehicle including an indicator with switchable lighting states configured to be switchable, an imager to capture an image of a preceding traveling vehicle located in front of the traveling vehicle, the captured image including an indicator of the preceding traveling vehicle, and a controller to control traveling of the traveling vehicle based on a determination result of lighting states of the indicator of the preceding traveling vehicle included in the captured image, wherein the indicator of the traveling vehicle includes a first indicator to notify a state of the traveling vehicle, and a second indicator such that a portion of the indicator of the traveling vehicle is in a lit state and a portion of the indicator of the traveling vehicle is in an unlit state.

The traveling vehicle of this configuration includes, in addition to the first indicator to notify the state of the traveling vehicle, the second indicator such that a portion of the indicator of traveling vehicle is in a lit state and a portion of the indicator of traveling vehicle is in an unlit state in a captured image captured by a following traveling vehicle located at the rear of the traveling vehicle. Thus, the captured image captured by the imager of following traveling vehicle always includes both the indicator of the traveling vehicle in the lit state and the indicator of the traveling vehicle in the unlit state, so that the determination of the lit state and the unlit state can be made based on both the indicator of the traveling vehicle in the lit state and the indicator of the traveling vehicle in the unlit state. As a result, even when a captured image influenced by disturbance light or the like is acquired, the lighting states of the indicator of the traveling vehicle can be determined accurately because both the indicator of the traveling vehicle in the lit state and the indicator of the traveling vehicle in the unlit state influenced by disturbance light or the like can be used as a determination reference to determine the lighting states. In other words, the lighting states of the indicator of the traveling vehicle can be accurately determined even in an environment influenced by disturbance light or the like.

In a traveling vehicle according to an aspect of the present invention, the controller may determine the lighting states of the indicator based on a luminance value of a portion corresponding to the indicator in the lit state and a luminance value of a portion corresponding to the indicator in the unlit state in the captured image. With this configuration, the luminance value in the lit state and the luminance value in the unlit state are acquired for each captured image, and references to determine the lighting states are switched for each captured image, so that even in an environment influenced by disturbance light or the like, the lighting states of the indicator can be accurately determined.

In a traveling vehicle according to an aspect of a preferred embodiment of the present invention, the controller may provide a plurality of measurement points in a portion corresponding to one indicator in the captured image, and based on a plurality of luminance values detected at the plurality of measurement points, calculate the luminance value of the portion corresponding to the one indicator. With this configuration, the lighting states of one indicator can be accurately determined even when the degree of influence of disturbance light differs in the one indicator.

In a traveling vehicle according to an aspect of a preferred embodiment of the present invention, a plurality of the first indicators are provided, and only one second indicator is provided and has the lighting states switchable by the controller to be the lighting states opposite to the lighting states of one of the first indicators that has been preset. With this configuration, in a situation where a space in which the indicator can be provided is limited, the lighting states of the indicator can be accurately determined with a minimum necessary configuration even in an environment influenced by disturbance light or the like.

In a traveling vehicle according to an aspect of a preferred embodiment of the present invention, a plurality of the first indicators are provided, and the second indicator may be provided in the same number as the number of the first indicators and corresponding to the first indicators, respectively, and has the lighting states switchable by the controller to be the lighting states opposite to the lighting states of corresponding one of the first indicators. With this configuration, the lighting states of the indicators can be accurately determined even when the degree of influence of the disturbance light differs for each of a plurality of the indicators.

In a traveling vehicle according to an aspect of a preferred embodiment of the present invention, the second indicator includes a pair of the indicators to be in a lit state and an unlit state at least when an image is captured by the imager. With this configuration, it is possible to obtain a captured image in which the indicators in the lit state and the unlit state are captured without switching the lighting states of the second indicator according to the lighting states of the first indicator.

This allows accurate determination of the lighting states of the indicator without performing complicated control.

A traveling vehicle system according to an aspect of a preferred embodiment of the present invention includes a plurality of the traveling vehicles described above, a track for the traveling vehicles to travel along in a predetermined direction, and a traveling vehicle controller to assign a transportation command to the traveling vehicles. The traveling vehicle provided in this traveling vehicle system can accurately determine the lighting states of the indicator even in an environment influenced by disturbance light or the like.

According to an aspect of a preferred embodiment of the present invention, lighting states of an indicator can be determined accurately in an environment influenced by disturbance light or the like.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a flowchart illustrating a series of operations of a preceding traveling vehicle and a following traveling vehicle in the traveling vehicle system.

FIG. 12 is a flowchart illustrating a flow in which a following traveling vehicle acquires a lighting pattern in a traveling vehicle system according to the modification.

DETAILED DESCRIPTION OF THE PREFERRED EMBODIMENTS

Preferred embodiments according to aspects of the present invention will be described in detail below with reference to the drawings. In the description of the drawings, identical elements will be denoted by identical reference signs and redundant explanations will be omitted.

Figure 1:
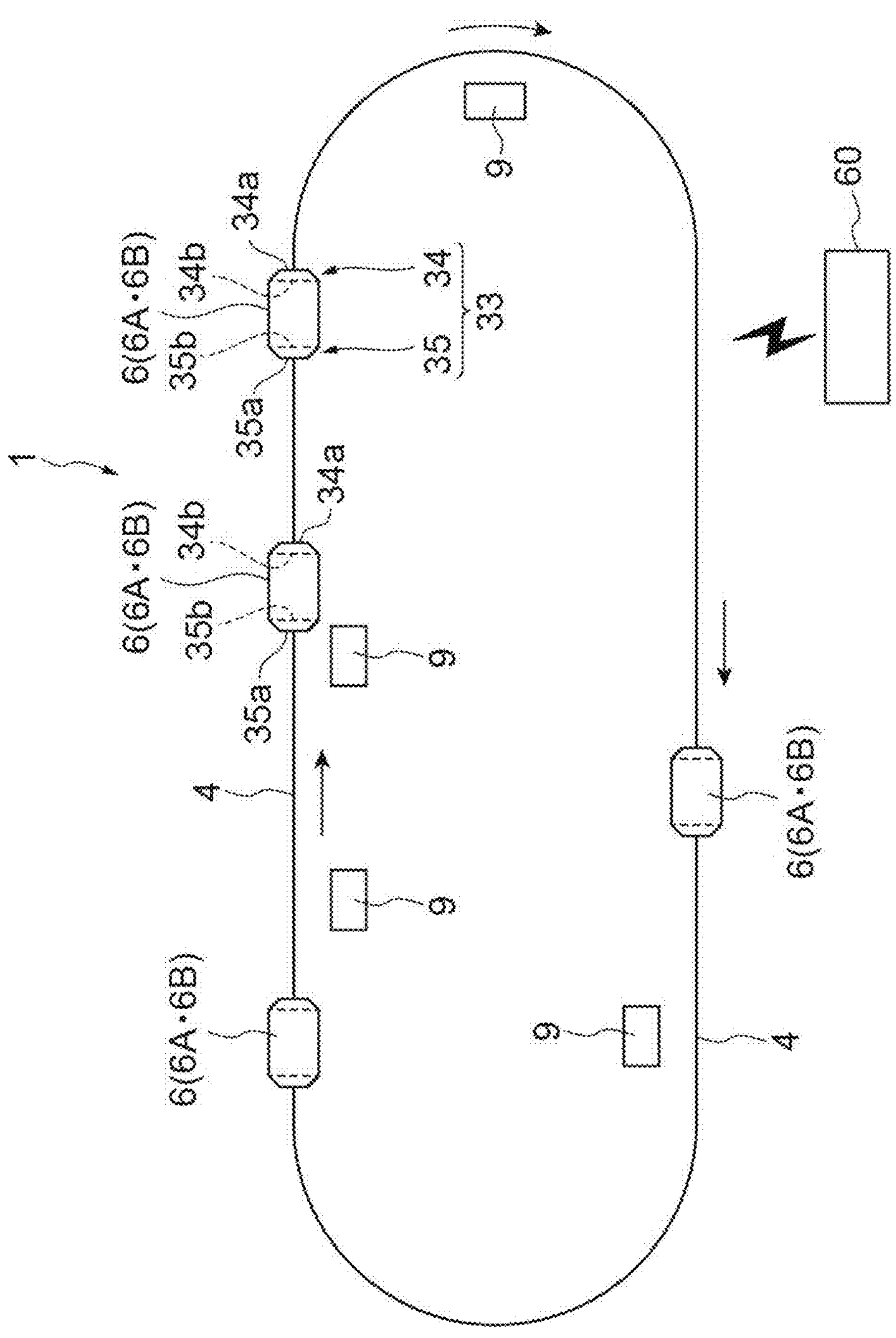
FIG. 1 is a schematic configuration diagram illustrating a traveling vehicle system according to a preferred embodiment of the present invention.

With reference to FIG. 1 to FIG. 10B mainly, a traveling vehicle system 1 of a preferred embodiment will be described. As illustrated in FIG. 1, the traveling vehicle system 1 is a system to transport an article 10 (see FIG. 2) by using an overhead traveling vehicle 6 capable of moving along a track (predetermined travel path) 4. Examples of the article 10 include containers such as a front opening unified pod (FOUP) storing a plurality of semiconductor wafers and a reticle pod storing a glass substrate, and common parts. In this case, the traveling vehicle system 1 in which, for example, the overhead traveling vehicle 6 (hereinafter simply referred to as "traveling vehicle 6") travels along the one-way track 4 that is laid on a ceiling or the like of a factory will be described as an example. As illustrated in FIG. 1, the traveling vehicle system 1 includes the track 4, a plurality of placement sections 9, and a plurality of the traveling vehicles 6.

Figure 2:
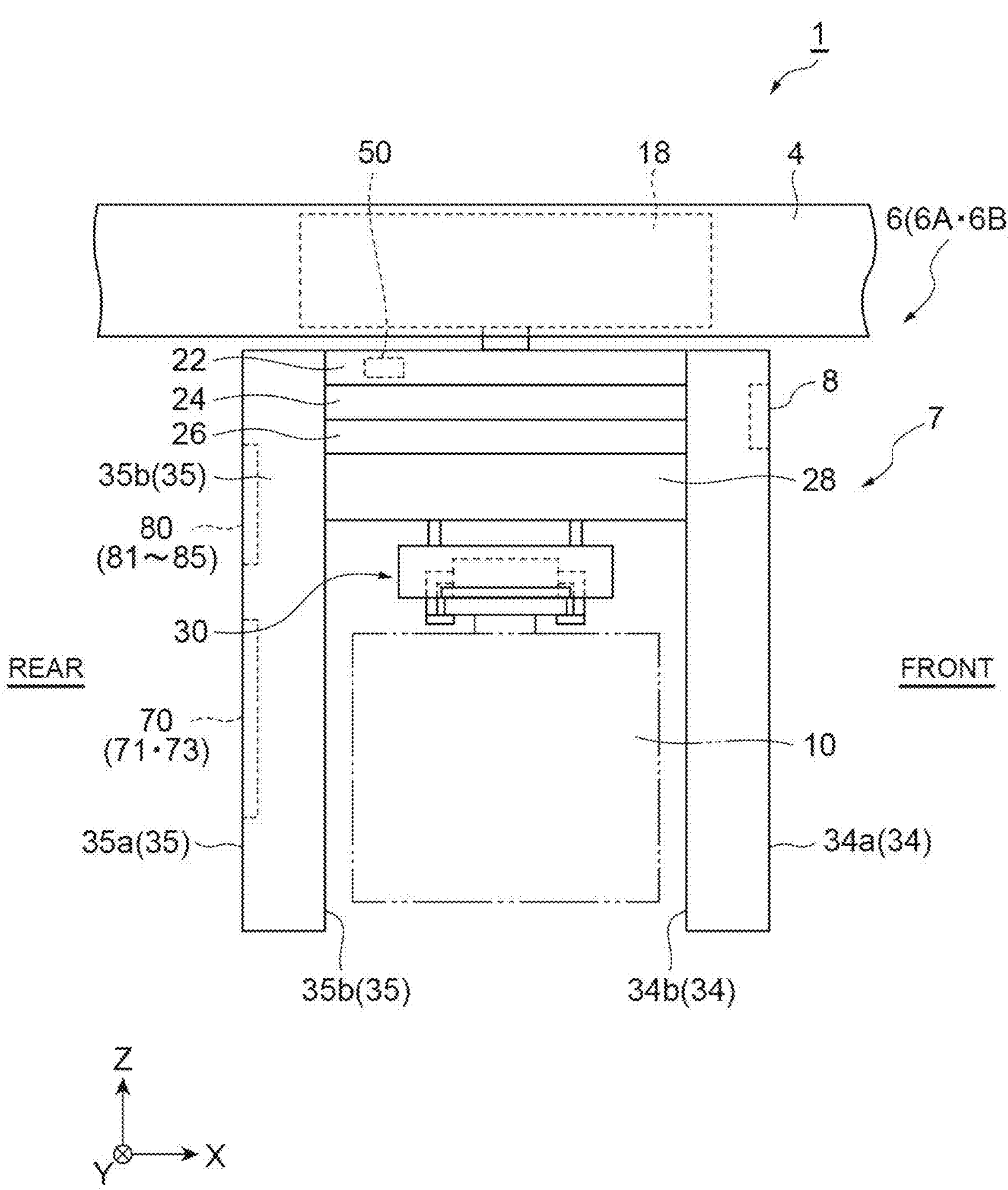
FIG. 2 is a side view illustrating a traveling vehicle according to a preferred embodiment of the present invention as viewed from a side.

As illustrated in FIG. 2, the track 4 is laid, for example, in the vicinity of the ceiling that is a space above a worker's head. The track 4 is, for example, suspended from the ceiling.

As illustrated in FIG. 1 and FIG. 2, the placement sections 9 are arranged along the track 4 and provided at locations where the article 10 can be delivered to and from the traveling vehicle 6. The placement sections 9 each include a buffer and a delivery port. The buffer is a placement section on which the article 10 is temporarily placed. The buffer is, for example, a placement section on which the article 10 is temporarily placed when the article 10 transported by the traveling vehicle 6 is unable to be transferred to a target delivery port for the reason that another article 10 has been placed on the target delivery port. The delivery port is, for example, a placement section for delivery of the article 10 to and from a semiconductor processing device (not illustrated) such as a cleaning device, a deposition device, a lithography device, an etching device, a thermal treatment device, and a planarization device. The processing device is not limited to a specific device and may be a variety of devices.

For example, the placement sections 9 are arranged to a side of the track 4. In this case, the traveling vehicle 6 delivers the article 10 to and from the placement section 9, by laterally feeding an elevation driver 28 or the like by a lateral feed unit 24 and by elevating and lowering an elevation unit 30. Although not illustrated, the placement section 9 may be arranged immediately below the track 4. In this case, the traveling vehicle 6 elevates and lowers the elevation unit 30 to deliver the article 10 to and from the placement section 9.

Figure 3:
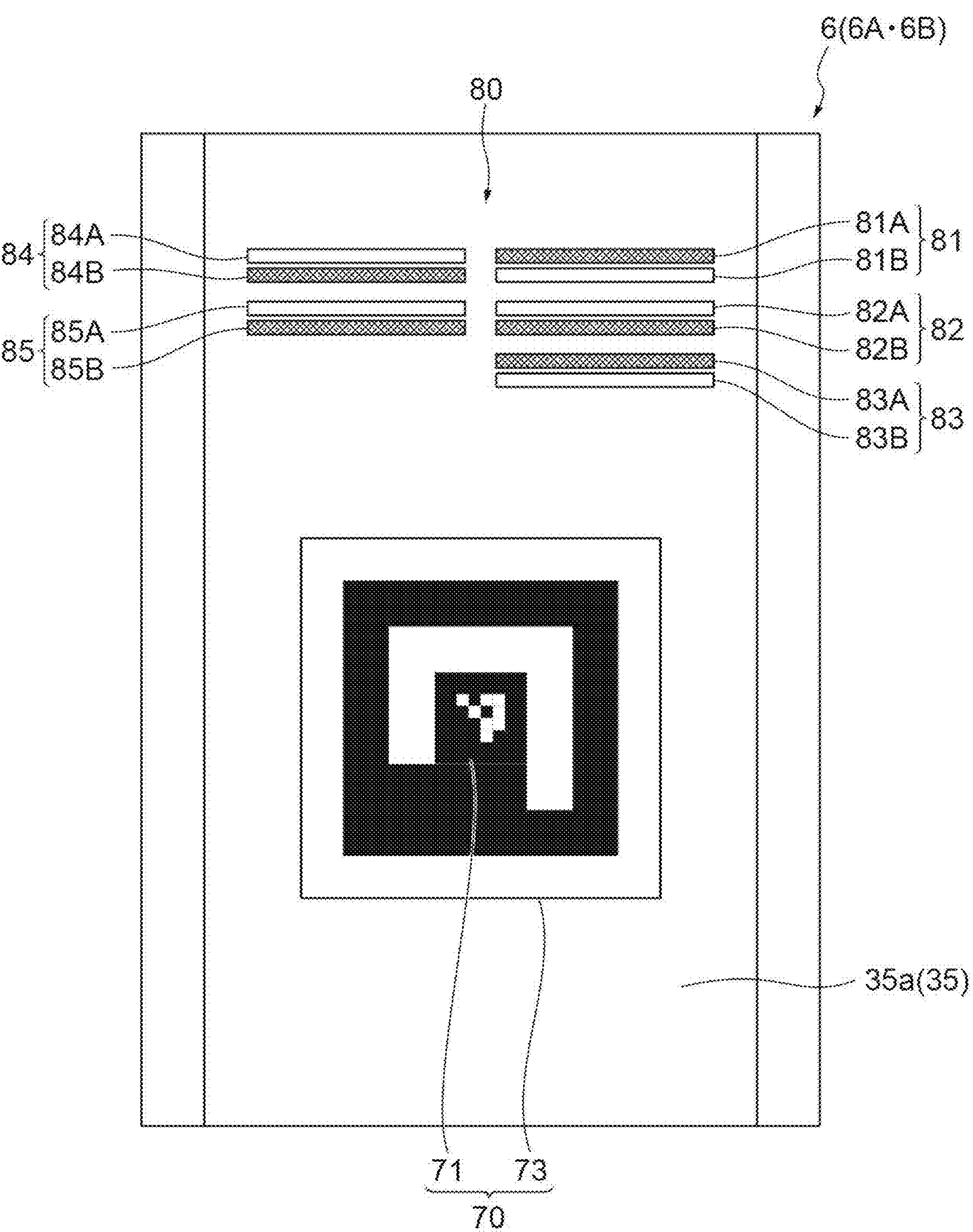
FIG. 3 is a rear view of a body of the traveling vehicle in FIG. 1 as viewed from the rear in a traveling direction.

The traveling vehicle 6 travels along the track 4 and transports the article 10. The traveling vehicle 6 is configured so that the article 10 can be transferred. The traveling vehicle 6 is an automated overhead transport vehicle. The number of traveling vehicles 6 included in the traveling vehicle system 1 is not particularly limited and is more than one. As illustrated in FIG. 2 and FIG. 3, the traveling vehicles 6 each include a traveling unit 18, a body 7, an imager 8, a marker 70, an indicator (indication unit) 80, and a control unit 50.

The traveling unit 18 includes a motor or the like and causes the traveling vehicle 6 to travel along the track 4. The body 7 includes a body frame 22, the lateral feed unit 24, a drive 26, the elevation driver 28, the elevation unit 30, and a body cover 33.

The body frame 22 supports the lateral feed unit 24, the θ drive 26, the elevation driver 28, and the elevation unit 30. The lateral feed unit 24 laterally feeds the θ drive 26, the elevation driver 28, and the elevation unit 30 collectively in a direction perpendicular to the traveling direction of the track 4. The θ drive 26 turns at least one of the elevation driver 28 and the elevation unit 30 within a predetermined angle range in a horizontal plane. The elevation driver 28 elevates and lowers the elevation unit 30 by reeling and unreeling a hanging member such as a wire, rope, or belt. The elevation unit 30 has a chuck and can freely grip or release the article 10.

The body cover 33 is provided at each of the front and the rear of the traveling vehicle 6. The body cover 33 extends and retracts a not-illustrated claw and prevents the article 10 from dropping during transportation. The body cover 33 includes a front cover 34 provided at the front of the traveling vehicle 6 and a rear cover 35 provided at the rear of the traveling vehicle 6 in the traveling direction. The front cover 34 preferably has a substantially isosceles trapezoidal shape in plan view when viewed from above, and mainly has a front surface 34*a* facing outward (forward), and a rear surface 34*b* facing inward (rearward) where the elevation unit 30 is provided. The rear cover 35 preferably has a substantially isosceles trapezoidal shape in plan view when viewed from above, and has a rear surface 35*a* facing outward (rearward), and a front surface 35*b* facing inward (forward) where the elevation unit 30 is provided.

The imager 8 is provided on the front surface 34*a* of the front cover 34 of the body 7 so that the image capturing range is in front of the traveling vehicle 6 that is the traveling vehicle. The imager 8 includes a lens and an imaging element or the like that converts light entering from the lens into an electrical signal. The imager 8 captures an image of a preceding traveling vehicle 6A, which is the traveling vehicle 6 located at the front of the traveling vehicle 6, to include the marker 70 and the indicator (indication unit) 80 provided on the preceding traveling vehicle 6A in the captured image. The captured image acquired by the imager 8 is acquired by the control unit 50 which will be described in detail in a subsequent paragraph.

Figure 4A:
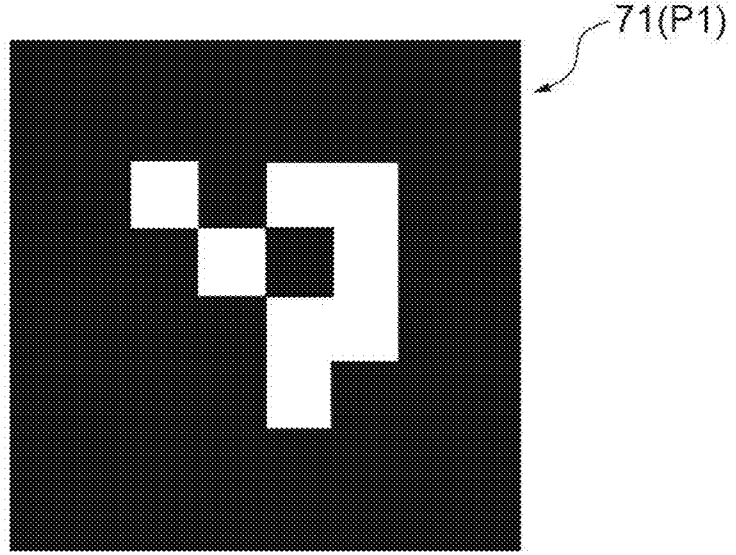
FIG. 4A is an example of a color scheme pattern for a small marker and FIG. 4B is an example of a color scheme pattern for a large marker.
Figure 4B:
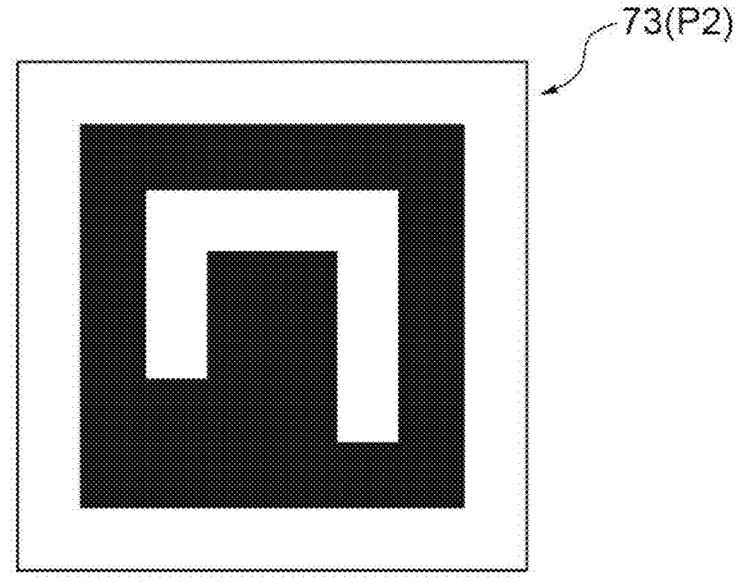

As illustrated in FIG. 3, the marker 70 is provided on the rear surface 35*a* of the rear cover 35 so as to be visible from a following traveling vehicle 6B, which is the traveling vehicle 6 located at the rear of the traveling vehicle 6. The marker 70 includes a small marker 71 with a first color scheme pattern P1 including white and black as illustrated in FIG. 4A and a large marker 73 with a second color scheme pattern P2 including white and black as illustrated in FIG. 4B. The marker 70 is, for example, an AR marker. The large marker 73 has a larger area than the area of the small marker 71. The small marker 71 is arranged inside the region where the large marker 73 is configured. The center (center of gravity) position of the region of the small marker 71 may coincide with the center (center of gravity) position of the region of the large marker 73.

The large marker 73 is formed in a size that does not entirely fit within the image capturing range of the imager 8 included in the following traveling vehicle 6B located at a position at which a distance from the traveling vehicle 6 is less than a predetermined distance (for example, about 0.5 m). The small marker 71 is formed in a size that entirely fits within the image capturing range of the imager 8 included in the following traveling vehicle 6B even if the distance from the traveling vehicle 6 is less than the predetermined distance (for example, about 0.5 m).

In this case, "the small marker 71 entirely fits within the image capturing range" includes not only the case of being captured in a size that is extracted (recognized) by a pattern recognition unit 51 which will be described in detail in a subsequent paragraph but also the case of being captured in a size that is not extracted (recognized) by the pattern recognition unit 51. That is, the region where the small marker 71 is placed only needs to be included in the image capturing range, and it does not matter whether the imager 8 is in focus. Moreover, "even if the distance is less than the above-described predetermined distance" in this case may be the case where the distance at which the traveling vehicles 6 and 6 at the front and the rear can come close to each other is of the lower limit value.

The small marker 71 and the large marker 73 may be directly drawn on the rear cover 35, or a plate or the like on which the small marker 71 and the large marker 73 are drawn may be fixed to the rear cover 35. The images of the small marker 71 and the large marker 73 may be displayed on a display unit such as a liquid crystal display provided on the rear cover 35.

As illustrated in FIG. 3, the indicator 80 includes a plurality of rectangular regions (indication units) with lighting states (a lit state or an unlit state) configured to be switchable. Each of the rectangular regions in the present preferred embodiment is elongated in one direction (lateral direction). A light source for each rectangular region is s an LED bulb, halogen bulb, fluorescent bulb, incandescent bulb, or the like. Lighting control in each region is performed by the control unit 50. The indicator 80 in the present preferred embodiment includes a first indicator pair 81, a second indicator pair 82, a third indicator pair 83, a fourth indicator pair 84, and a fifth indicator pair 85, each including a pair of rectangular regions.

One rectangular region of each of the first indicator pair 81 to the fifth indicator pair 85 functions as a state notification unit (first indication unit) to notify a state of the traveling vehicle 6 (e.g., a traveling state, which is an accelerated state or a decelerated state). Hereafter, the one rectangular regions in the first indicator pair 81, the second indicator pair 82, the third indicator pair 83, the fourth indicator pair 84, and the fifth indicator pair 85 will be referred to as a first indicator 81A, a first indicator 82A, a first indicator 83A, a first indicator 84A, and a first indicator 85A, respectively.

The first indicators 81A, 82A, 83A, 84A, and 85A switch lighting patterns according to the state of the traveling vehicle 6 on which the first indicators 81A, 82A, 83A, 84A, and 85A are provided. Specifically, the first indicators 81A, 82A, 83A, 84A, and 85A switch lighting patterns by combining rectangular regions in the lighting states and rectangular regions in the unlit state in the five rectangular regions (hereinafter simply referred to as "combination of lighting"). The switching of lighting patterns is performed by the control unit 50.

The first indicator 85A is used as a parity. That is, the first indicator 85A is used to ensure that the combination of lighting of the four first indicators 81A, 82A, 83A, and 84A is the lighting pattern intended by the control unit 50.

The other rectangular regions of the first indicator pair 81 to the fifth indicator pair 85 function as determination reference indicators (second indication units) for including, in the captured image, both the above rectangular region in the lit state and the above rectangular region in the unlit state. Hereafter, the other rectangular regions in the first indicator pair 81, the second indicator pair 82, the third indicator pair 83, the fourth indicator pair 84, and the fifth indicator pair 85 will be referred to as a second indicator 81B, a second indicator 82B, a second indicator 83B, a second indicator 84B, and a second indicator 85B, respectively.

The second indicators 81B, 82B, 83B, 84B, and 85B are provided in the same number as the number of the first indicators 81A, 82A, 83A, 84A, and 85A and corresponding to the first indicators 81A, 82A, 83A, 84A, and 85A, respectively. The lighting states of the second indicators 81B, 82B, 83B, 84B, and 85B are switched by the control unit 50 so that the lighting states are opposite to those of the respective first indicators 81A, 82A, 83A, 84A, and 85A.

In the first indicator pair 81, a protrusion protruding in a plate shape from the rear surface 35*a* of the rear cover 35 may be provided between the first indicator 81A and the second indicator 81B, which are provided as a pair. Providing such a protrusion prevents light emitted from one of the first indicator 81A and the second indicator 81B from influencing (becoming disturbance light to) the other of the first indicator 81A and the second indicator 81B. Similarly, the first indicators 82A, 83A, 84A, and 85A and the second indicators 82B, 83B, 84B, and 85B, of the second indicator pair 82 to the fifth indicator pair 85, may be provided with the protrusion described above. A similar protrusion may also be provided between adjacent indicator pairs, for example, between the first indicator pair 81 and the second indicator pair 82.

Figure 5:
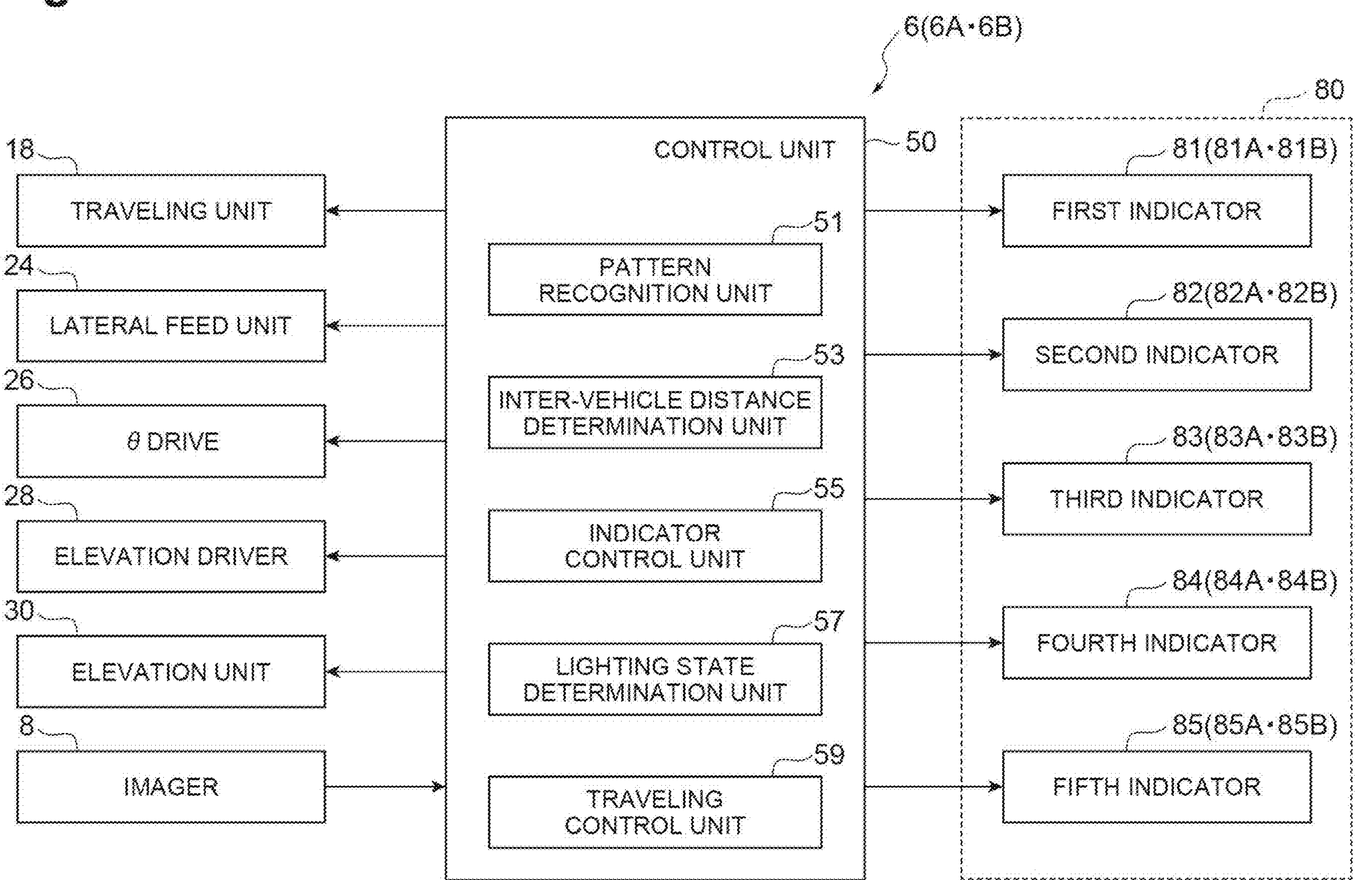
FIG. 5 is a block diagram illustrating a functional configuration of the traveling vehicle system.

The control unit 50 illustrated in FIG. 5 is an electronic control unit including a central processing unit (CPU), a read only memory (ROM), and a random access memory (RAM). The control unit 50 controls various operations in the traveling vehicle 6. Specifically, the control unit 50 controls the traveling unit 18, the lateral feed unit 24, the θ drive 26, the elevation driver 28, the elevation unit 30, and the imager 8. The control unit 50 can be configured, for example, as software that is a program stored in the ROM, loaded into the RAM, and executed by the CPU. The control unit 50 may be configured as hardware with electronic circuitry, for example. In the control unit 50, as the hardware such as the CPU, the RAM, and the ROM, and the software such as the program collaborate, the pattern recognition unit 51, an inter-vehicle distance determination unit 53, an indicator control unit 55, a lighting state determination unit 57, and a traveling control unit 59 as described in detail below are formed. The control unit 50 communicates with a traveling vehicle controller 60 using a communication line (feeder line) of the track 4.

The pattern recognition unit 51 attempts to recognize (extract) the marker 70 from a captured image acquired by the imager 8. The pattern recognition unit 51 recognizes the small marker 71 based on a captured image in which the small marker 71 is entirely included in the image capturing range of the imager 8 and the large marker 73 is not entirely included in the image capturing range, and also recognizes the large marker 73 based on a captured image in which the small marker 71 and the large marker 73 are entirely included in the image capturing range. More specifically, the pattern recognition unit 51 recognizes the small marker 71 by recognizing the first color scheme pattern P1 illustrated in FIG. 4A in the captured image. The pattern recognition unit 51 recognizes the large marker 73 by recognizing the second color scheme pattern P2 illustrated in FIG. 4B in the captured image.

Returning to FIG. 5, the inter-vehicle distance determination unit 53 determines whether the preceding traveling vehicle 6A is present based on the recognition of the small marker 71 and/or the large marker 73 by the pattern recognition unit 51. The inter-vehicle distance determination unit 53 determines that the preceding traveling vehicle 6A is present when at least one of the entire small marker 71 and the entire large marker 73 is extracted from a captured image. When the small marker 71 is recognized by the pattern recognition unit 51, the inter-vehicle distance determination unit 53 in the present preferred embodiment determines that the distance from the traveling vehicle 6 to the preceding traveling vehicle 6A is smaller than that when the large marker 73 is recognized. More specifically, the inter-vehicle distance determination unit 53 determines that the distance from the traveling vehicle 6 to the preceding traveling vehicle 6A is less than about 0.5 m, for example, when the small marker 71 is recognized by the pattern recognition unit 51, and the distance from the traveling vehicle 6 to the preceding traveling vehicle 6A is about 0.5 m or more, for example, when the large marker 73 is recognized.

The indicator control unit 55 switches the lighting patterns of the indicator 80 according to the state of the traveling vehicle 6. Specifically, for example, when the indicator control unit 55 receives a command from the traveling vehicle controller 60 or determines the distance from the preceding traveling vehicle 6A by the pattern recognition unit 51, and thus acquires that the state of the traveling vehicle 6 is going to be in an accelerated state or a decelerated state (or has been in the accelerated state or the decelerated state), the indicator control unit 55 controls the lighting of the first indicators 81A, 82A, 83A, 84A, and 85A to be in the lighting pattern corresponding to the acquired traveling state. In other words, the indicator control unit 55 transmits the state of the traveling vehicle 6 to the following traveling vehicle 6B by switching the lighting patterns of the first indicators 81A, 82A, 83A, 84A, and 85A provided on the traveling vehicle 6.

The indicator control unit 55 controls the lighting of the second indicators 81B, 82B, 83B, 84B, and 85B to be in the opposite the lighting states to the lighting pattern of the first indicators 81A, 82A, 83A, 84A, and 85A, that is, the lighting states of the respective first indicators 81A, 82A, 83A, 84A, and 85A, based on the state of the traveling vehicle 6. The indicator control unit 55, for example, controls the lighting of the second indicator 81B to be in the unlit state when the first indicator 81A is in the lit state, and controls the lighting of the second indicator 81B to be in the lit state when the first indicator 81A is in the unlit state.

The indicator control unit 55 controls the lighting states of the first indicator 85A according to a rule that defines the lighting states for each lighting pattern of the first indicators 81A, 82A, 83A, and 84A.

The lighting state determination unit 57 detects the small marker 71 and/or the large marker 73 from a captured image captured by the imager 8 and identifies the relative positions and postures of the small marker 71 and/or the large marker 73 with respect to the imager 8. The relative positions and postures described above can be identified by a known AR marker processing procedure. Based on the above relative positions and postures, the lighting state determination unit 57 identifies the relative position and posture of each indicator with respect to the imager 8 and identifies the position (region) of the indicator in the captured image.

The lighting state determination unit 57 determines the lighting states of the first indicators 81A, 82A, 83A, 84A, and 85A of the first indicator pair 81 to the fifth indicator pair 85. A method of determining the lighting states of the first indicator 81A of the first indicator pair 81 is described here. The lighting state determination unit 57 detects a luminance value LV11 of the portion corresponding to the first indicator 81A and a luminance value LV12 of the portion corresponding to the second indicator 81B in the captured image.

As illustrated in FIG. the 6, lighting state determination unit 57 provides a plurality of (e.g., nine) measurement points MP11, MP12, . . . , MP1*n*, . . . , MP19 in the portion corresponding to the first indicator 81A in the captured image, and sets the average value of a plurality of luminance values detected at the respective measurement points, as the luminance value LV11 of the first indicator 81A. The lighting state determination unit 57 provides a plurality of (e.g., nine) measurement points MP21, MP22, . . . , MP2*n*, . . . , MP29 in the portion corresponding to the second indicator 81B in the captured image, and sets the average value of a plurality of luminance values detected at the respective measurement points, as the luminance value LV12 of the second indicator 81B.

When the lighting state determination unit 57 confirms that the luminance value LV11>the luminance value LV12 is true, the lighting state determination unit 57 determines that the first indicator 81A is in the lit state. When the lighting state determination unit 57 confirms that the luminance value LV11<the luminance value LV12 is true, the lighting state determination unit 57 determines that the first indicator 81A is in the unlit state.

The lighting state determination unit 57 determines the lighting states of the first indicators 82A, 83A, 84A, and 85A by the same method as the method used to determine the lighting states of the first indicator 81A. The lighting state determination unit 57 identifies the lighting pattern of the first indicators 81A, 82A, 83A, 84A, and 85A based on the lighting states of the first indicators 81A, 82A, 83A, 84A, and 85A. The lighting state determination unit 57 may binarize the captured image based on the lighting states of the first indicators 81A, 82A, 83A, 84A, and 85A, and identify a lighting pattern based on the binarized image. The lighting state determination unit 57 determines the state of the preceding traveling vehicle 6A based on the identified lighting pattern. The lighting pattern of the first indicators 81A, 82A, 83A, 84A, and 85A, and the state of the preceding traveling vehicle 6A are associated with each other and stored in a storage or the like, which is not illustrated.

When the large marker 73 is recognized by the pattern recognition unit 51, the traveling control unit 59 controls the traveling unit 18 to travel at a speed slower than a normal moving speed, for example. When the small marker 71 is recognized by the pattern recognition unit 51, the traveling control unit 59 controls the traveling unit 18 to come to a complete stop. This control is an example, and the control performed when the small marker 71 and the large marker 73 are distinctively recognized by the pattern recognition unit 51 is not limited to the above control.

The traveling control unit 59 controls the traveling of the traveling vehicle 6 based on the result of determining the lighting states of the first indicators 81A, 82A, 83A, 84A, and 85A. More specifically, the traveling control unit 59 controls the traveling of the traveling vehicle 6 based on the state of the preceding traveling vehicle 6A identified from the lighting pattern of the first indicators 81A, 82A, 83A, 84A, and 85A. When the traveling control unit 59 identifies that the state of the preceding traveling vehicle 6A is, for example, the decelerated state, the traveling control unit 59 controls the traveling unit 18 to decelerate the traveling vehicle 6. When the traveling control unit 59 identifies that the state of the preceding traveling vehicle 6A is, for example, the accelerated state, the traveling control unit 59 controls the traveling unit 18 to accelerate the traveling vehicle 6.

The traveling vehicle controller 60 illustrated in FIG. 1 is an electronic control unit including a CPU, a ROM, a RAM, and the like. The traveling vehicle controller 60 can be configured, for example, as software that is a program stored in the ROM, loaded into the RAM, and executed by the CPU. The traveling vehicle controller 60 may be configured as hardware with electronic circuitry, for example. The traveling vehicle controller 60 transmits a transportation command to the traveling vehicle 6 to transport the article 10.

Figure 8:
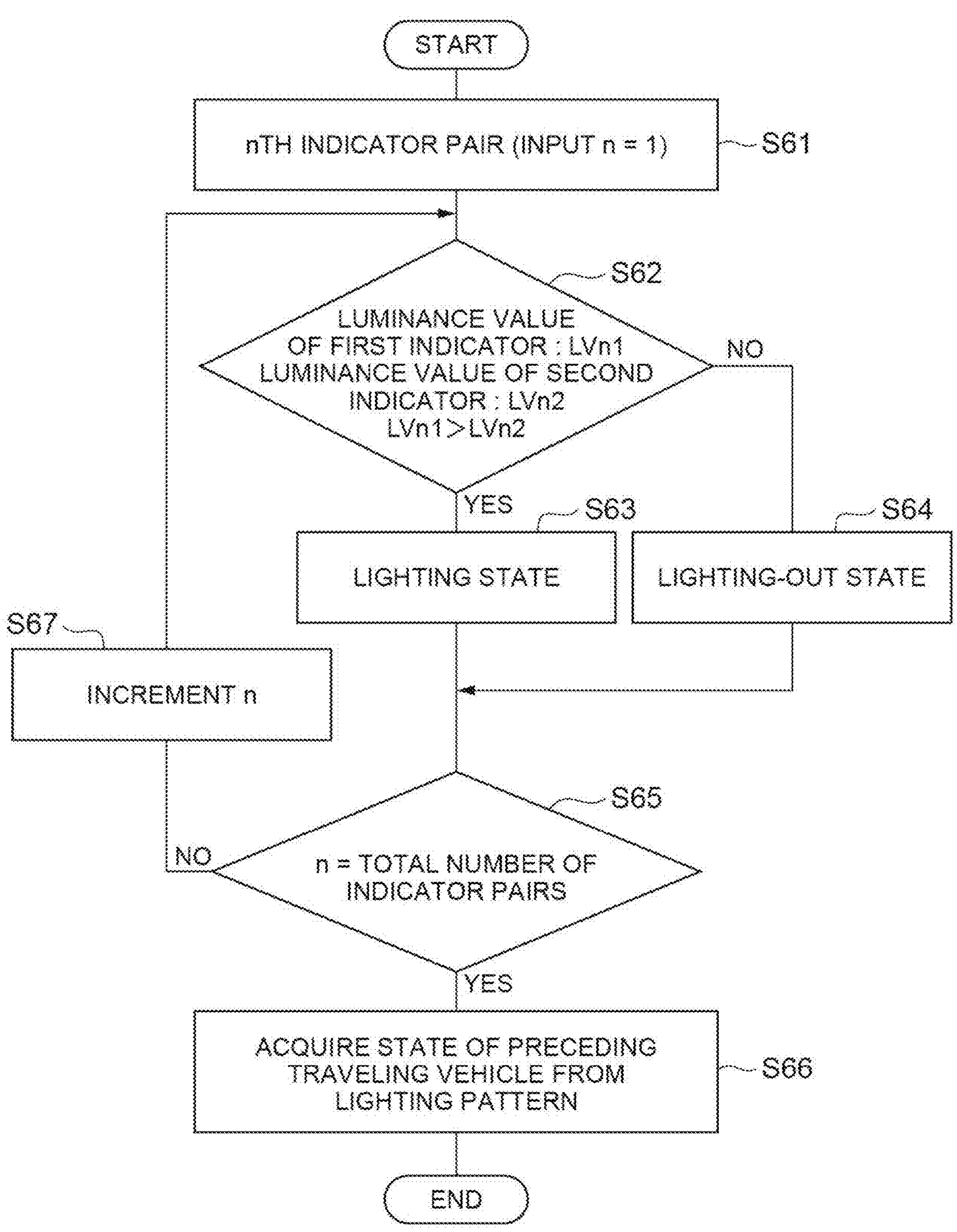
FIG. 8 is a flowchart illustrating a flow in which a following traveling vehicle acquires a lighting pattern in the traveling vehicle system.

The operation of the preceding traveling vehicle 6A and the following traveling vehicle 6B is described mainly using FIGS. 7 and 8 for the case where the preceding traveling vehicle 6A accelerates forward, for example, upon receiving a transportation command from the traveling vehicle controller 60. When the preceding traveling vehicle 6A accelerates forward, the first indicators 81A, 82A, 83A, 84A, and 85A are used to notify the following traveling vehicle 6B that the state of the traveling vehicle 6 is the accelerated state. As illustrated in FIG. 7, specifically, the indicator control unit 55 of the preceding traveling vehicle 6A controls the lighting of the first indicators 81A, 82A, 83A, 84A, and 85A so that the lighting pattern indicates that the state of the traveling vehicle 6 is the accelerated state (step S1).

The following traveling vehicle 6B captures an image of the marker 70 and the indicator 80 on the rear surface of the preceding traveling vehicle 6A by the imager 8. The lighting state determination unit 57 of the following traveling vehicle 6B detects the small marker 71 and/or the large marker 73 from the captured image captured by the imager 8 (step S2). The lighting state determination unit 57 identifies the relative positions and postures of the small marker 71 and/or the large marker 73 with respect to the imager 8. Based on the above relative positions and postures, the lighting state determination unit 57 identifies the relative position and posture of each indicator with respect to the imager 8 (step S3) and identifies the position (region) of the indicator in the captured image (step S4).

Figure 6:
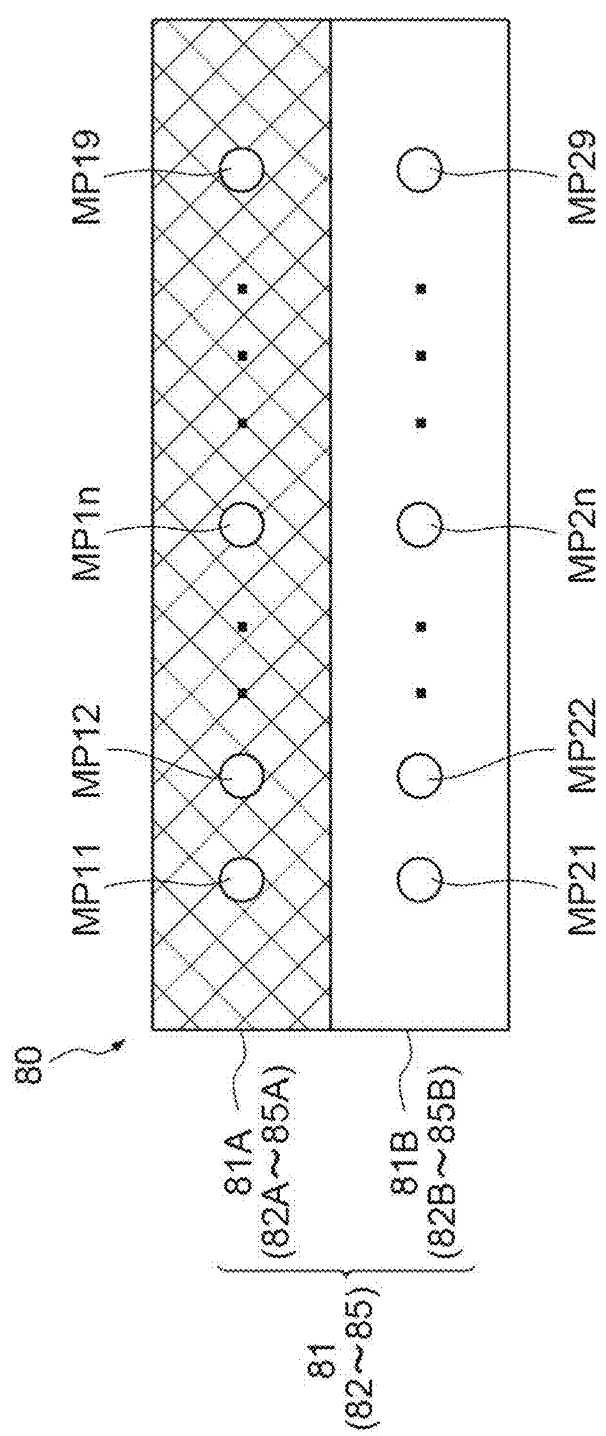
FIG. 6 is a drawing for explaining a method of calculating a luminance value in a rectangular region.

The lighting state determination unit 57 identifies the luminance values of the portions corresponding to the first indicators 81A, 82A, 83A, 84A, and 85A of the first indicator pair 81 to the fifth indicator pair 85 in the captured image (step S5). As illustrated in FIG. 6, the lighting state determination unit 57 sets the average value of a plurality of luminance values of each of the portions corresponding to the first indicators 81A, 82A, 83A, 84A, and 85A in the captured image, as the corresponding one of the luminance values of the first indicators 81A, 82A, 83A, 84A, and 85A. The lighting state determination unit 57 sets the average value of the plurality of luminance values of each of the portions corresponding to the second indicators 81B, 82B, 83B, 84B, and 85B in the captured image, as the corresponding one of the luminance values of the second indicators 81B, 82B, 83B, 84B, and 85B.

The lighting state determination unit 57 acquires the state of the preceding traveling vehicle 6A from the luminance values of the portions corresponding to the first indicators 81A, 82A, 83A, 84A, and 85A in the captured image (step S6). Step S6 is described in detail below.

As illustrated FIG. 8, the lighting state in determination unit 57 determines the lighting states of the first indicator 81A of the first indicator pair 81 (step S61). The lighting state determination unit 57 compares the luminance value LV11 of the first indicator 81A identified in step S5 (see FIG.

7) with the luminance value LV12 of the second indicator 81B (step S62). When the lighting state determination unit 57 confirms that the luminance value LV11>the luminance value LV12 is true (step S62: YES), the lighting state determination unit 57 determines that the first indicator 81A is in the lit state (step S63). When the lighting state determination unit 57 confirms that the luminance value LV11<the luminance value LV12 is true (step S62: NO), the lighting state determination unit 57 determines that the first indicator 81A is in the unlit state (step S64).

The lighting state determination unit 57 determines whether the lighting states of all the first indicators 81A, 82A, 83A, 84A, and 85A of the first indicator pair 81 to the fifth indicator pair 85 have been confirmed (step S65). When the lighting state determination unit 57 has not confirmed the lighting states of all the first indicators 81A, 82A, 83A, 84A, and 85A, the lighting state determination unit 57 increments n entered in step S61 (step S67) and repeats the process from step S62 to step S65. That is, the lighting state determination unit 57 determines the lighting states of the first indicator 82A of the second indicator pair 82, the first indicator 83A of the third indicator pair 83, the first indicator 84A of the fourth indicator pair 84, and the first indicator 85A of the fifth indicator pair 85.

When the lighting state determination unit 57 has confirmed the lighting states of all the first indicators 81A, 82A, 83A, 84A, and 85A of the first indicator pair 81 to the fifth indicator pair 85 (step S65: YES), the lighting state determination unit 57 identifies the lighting pattern of the first indicators 81A, 82A, 83A, 84A, and 85A based on the lighting states of the first indicators 81A, 82A, 83A, 84A, and 85A. The lighting state determination unit 57 acquires the state (e.g., accelerated state) stored in association with the identified lighting pattern (step S66).

Returning to FIG. 7, the traveling control unit 59 of the following traveling vehicle 6B controls the traveling unit 18 of the following traveling vehicle 6B based on the traveling state of the preceding traveling vehicle 6A acquired by the lighting state determination unit 57 (step S7). For example, when the traveling state of the preceding traveling vehicle 6A, as acquired by the lighting state determination unit 57, is an accelerated state, the traveling control unit 59 controls the traveling unit 18 so that the following traveling vehicle 6B follows the preceding traveling vehicle 6A to be in the accelerated state. This allows the following traveling vehicle 6B to smoothly follow the preceding traveling vehicle 6A. The contents of the control of the following traveling vehicle 6B with respect to the state of the preceding traveling vehicle 6A are associated with each other and stored in a storage or the like, which is not illustrated (step S8).

The traveling control unit 59 transmits the state of the preceding traveling vehicle 6A acquired by the lighting state determination unit 57 to the traveling vehicle controller 60.

Figure 9A:
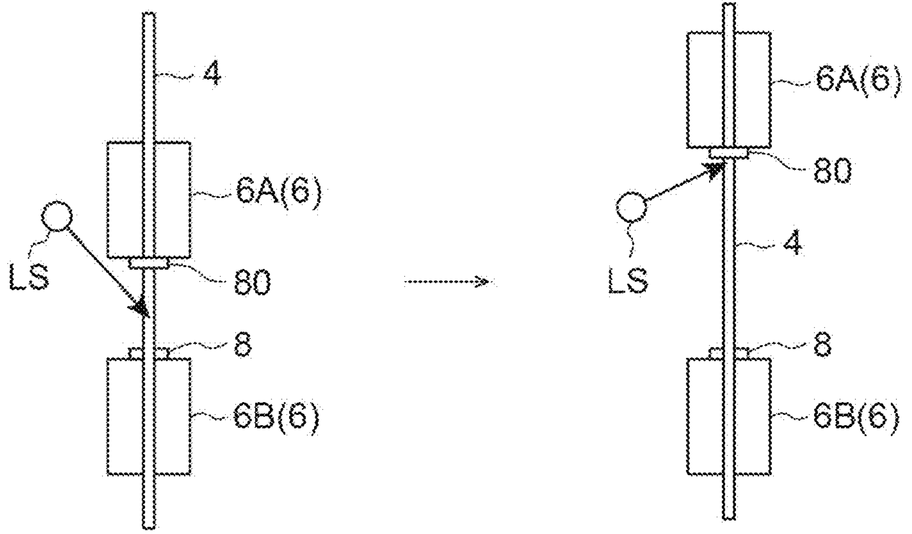
FIG. 9A is an example of a case in which disturbance light enters an indicator of a traveling vehicle.
Figure 9B:
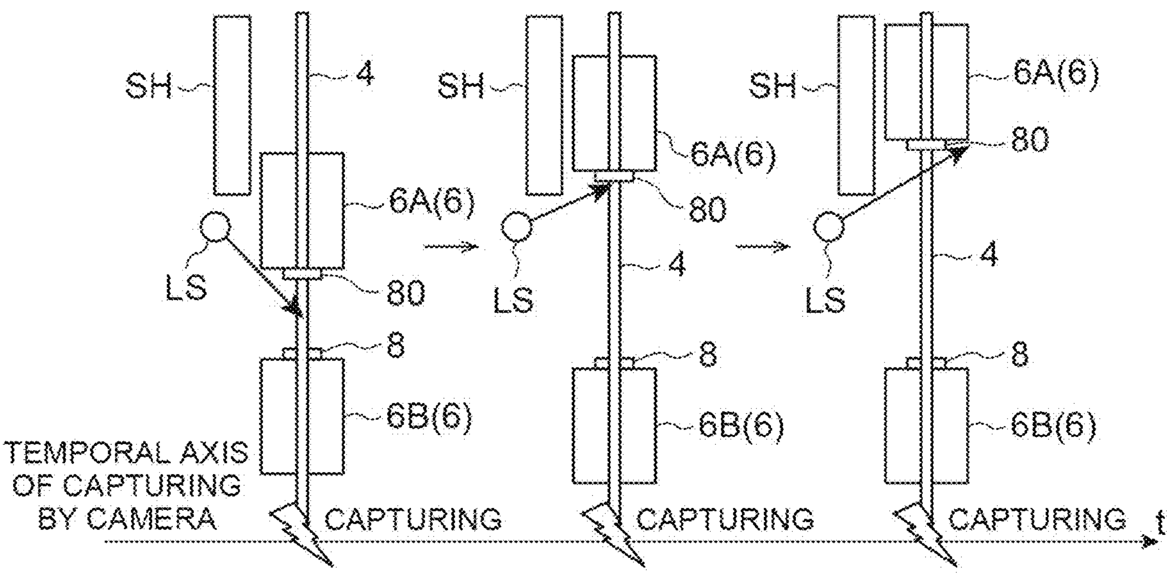
FIG. 9B is an example of a case illustrating that a degree of influence of disturbance light differs for each captured image.

Next, the operation and effect of the traveling vehicle 6 and the traveling vehicle system 1 of the above-described preferred embodiment is described. In an environment with high illumination or in a factory or the like where sunlight or the like partially enters, as illustrated in FIG. 9A, for example, the rectangular regions may be irradiated with illumination light or disturbance light LS such as sunlight when the traveling vehicle 6 is positioned within a predetermined range. In such a case, conventional determination methods, which determine the lighting states using a threshold calculated based on the luminance value of a rectangular region in the captured image with no incident disturbance light LS, may fail to properly determine the lighting states of the rectangular region because the influence of disturbance light LS is not considered in the threshold. As illustrated in FIG. 9B, even if the light source position of the disturbance light LS is the same, if there is, for example, a wall SH blocking the disturbance light LS, the incidence of the disturbance light LS on the indicator 80 changes over time. In other words, since the disturbance light LS may or may not act on the indicator 80 depending on the captured image, even if the threshold is set considering the disturbance light LS, the influence e of the disturbance light LS cannot be completely eliminated.

Therefore, in the traveling vehicle 6 and the traveling vehicle system 1 of the above-described preferred embodiment, as illustrated in FIG. 3, in addition to the rectangular regions (first indicators 81A, 82A, 83A, 84A, and 85A) provided to notify the state of the traveling vehicle 6, rectangular regions (second indicators 81B, 82B, 83B, 84B, and 85B) are provided to include both the rectangular region in the lit state and the rectangular region in the unlit state in the captured image captured by the following traveling vehicle 6B. Thus, both the rectangular region in the lit state and the rectangular region in the unlit state are always included in the captured image captured by the imager 8, so that the determination of the lit state and the unlit state can be made based on both the rectangular region in the lit state and the rectangular region in the unlit state. As a result, even when a captured image influenced by disturbance light LS or the like is acquired, the lighting states of the rectangular regions can be accurately determined because both t the rectangular region in the lit state and the rectangular region in the unlit state under the influence of disturbance light LS or the like can be used as a determination reference to determine the lighting states. In other words, the lighting states of the rectangular regions (first indicators 81A, 82A, 83A, 84A, and 85A) can be accurately determined even in an environment influenced by disturbance light or the like.

In the traveling vehicle 6 and the traveling vehicle system 1 of the above-described preferred embodiment, the control unit 50 determines the lighting states of the rectangular regions (first indicators 81A, 82A, 83A, 84A, and 85A) based on the luminance values of the portions corresponding to the rectangular regions in the lit state and the luminance values of the portions corresponding to the rectangular regions in the unlit state in the captured image. As a result, the luminance values in the lit state and the luminance values in the unlit state are acquired for each captured image, and the references to determine the lighting states are switched for each captured image, so that even in an environment influenced by disturbance light LS or the like, the lighting states of the rectangular regions (first indicators 81A, 82A, 83A, 84A, and 85A) can be accurately determined.

Figure 10A:
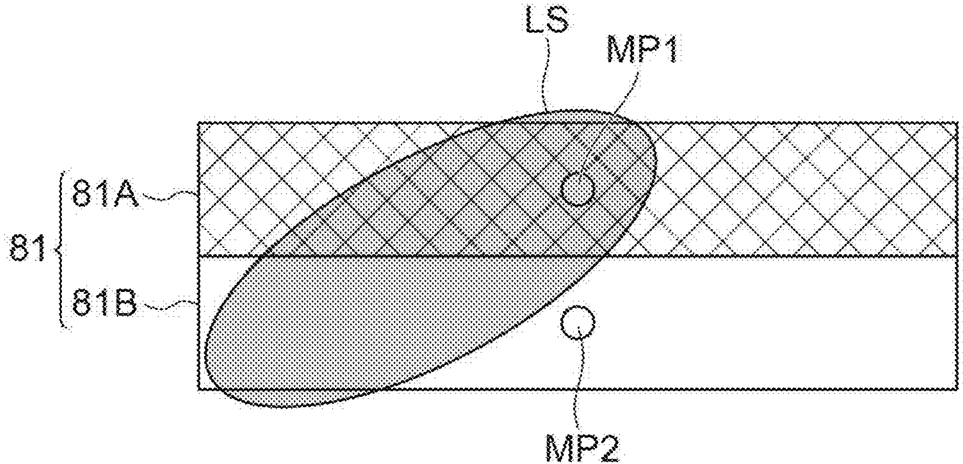
FIG. 10A is a drawing for explaining that the lighting states of one rectangular region is calculated from the luminance value at one measurement point.

For example, as illustrated in FIG. 10A, when the traveling vehicle 6 is positioned within a predetermined range, a portion of one indicator pair (e.g., first indicator pair 81) may be irradiated with disturbance light LS, such as illumination light or sunlight. In a case where the lighting states of the first indicator 81A is determined based on the luminance value at one measurement point MP1, when the measurement point MP1 is influenced by the disturbance light LS, it may fail to accurately determine the lighting states of the rectangular region of the first indicator 81A. Similarly for the rectangular region corresponding to the second indicator 81B, when the measurement point MP2 is influenced by the disturbance light LS, it may fail to accurately determine the lighting states of the rectangular region.

Figure 10B:
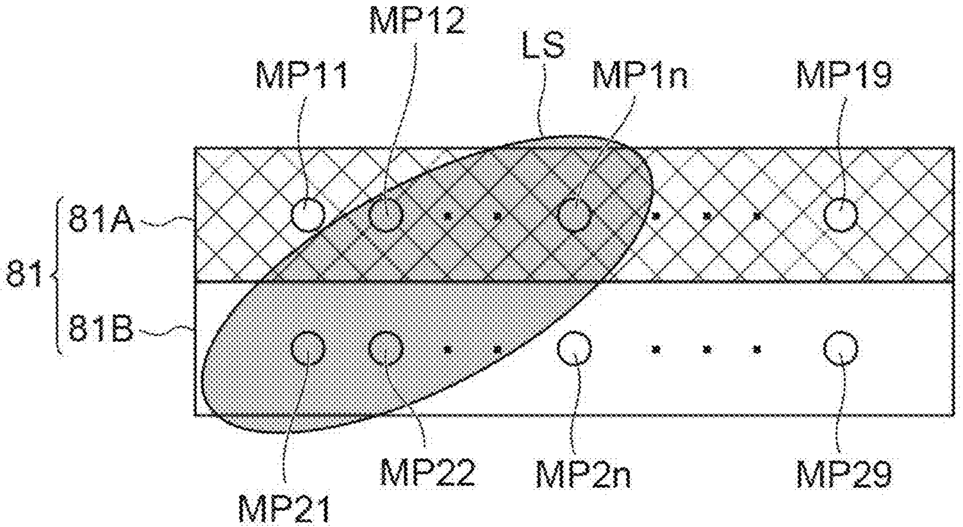
FIG. 10B is a drawing for explaining that the lighting states of one rectangular region is calculated from the luminance values at a plurality of measurement points.

Therefore, in the traveling vehicle 6 and the traveling vehicle system 1 of the above-described preferred embodiment, as illustrated in FIG. 10B, the control unit 50 provides a plurality of measurement points MP11, MP12, . . . , MP1$n$, . . . , MP19 in the portion corresponding to one rectangular region ((e.g., first indicator 81A) in the captured image, and based on a plurality of luminance values detected at the plurality of measurement points MP11, MP12, . . . , MP1$n$, . . . , MP19, calculates the luminance value of the portion corresponding to the one rectangular region. The same is true for the second indicator 81B. As a result, even if a portion of the rectangular region is irradiated with disturbance light LS, the influence on the portion irradiated with disturbance light LS can be reduced when the lighting states of the rectangular region in question is determined. In other words, the lighting states of a rectangular region can be accurately determined even when the degree of influence of disturbance light LS varies within a single rectangular region.

For example, when the traveling vehicle 6 is positioned within a predetermined range, only some of the plurality of indicators (e.g., the first indicator) may be irradiated with the disturbance light LS, such as illumination light or sunlight. When the indicator influenced by the disturbance light LS becomes the determination reference to determine the lighting states, it may fail to accurately determine the lighting states of the entire indicator 80.

Therefore, in the traveling vehicle 6 and the traveling vehicle system 1 of the above-described preferred embodiment, the plurality of first indicators 81A, 82A, 83A, 84A, and 85A, which notify the state of the traveling vehicle 6, and the second indicators 81B, 82B, 83B, 84B, and 85B, which are the same in number as the number of the first indicators 81A, 82A, 83A, 84A, and 85A and corresponding to the first indicators 81A, 82A, 83A, 84A, and 85A, respectively, are provided. With this configuration, the lighting states of a rectangular region can be accurately determined even when the degree of influence of the disturbance light LS differs for each of the plurality of rectangular regions.

Although preferred embodiments have been described above, aspects of the present invention are not limited to the above-described preferred embodiments. Various modifications can be made without departing from the gist of the present invention.

First Modification

Figure 11:
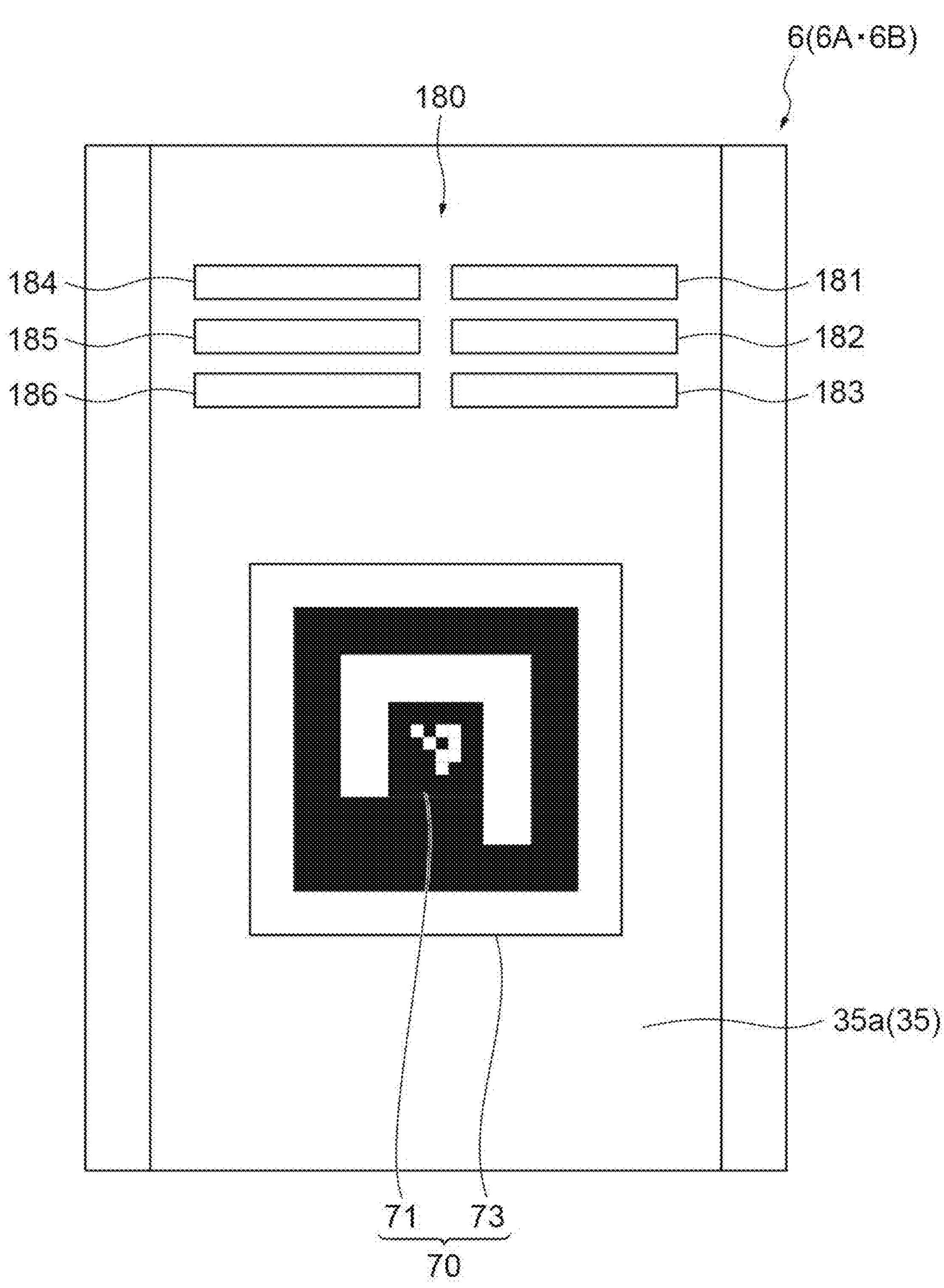
FIG. 11 is a rear view of a body of a traveling vehicle according to a modification as viewed from the rear in a traveling direction.

The traveling vehicle 6 and the traveling vehicle system 1 of the above-described preferred embodiments have been described with an example in which the second indicators 81B, 82B, 83B, 84B, and 85B are provided to be paired with a plurality of the first indicators 81A, 82A, 83A, 84A, and 85A, respectively, that notify the state of the traveling vehicle 6, but are not limited to this example. For example, as illustrated in FIG. 11, the traveling vehicle 6 may include a plurality of first indicators (first indication units) 181, 182, 183, 184, and 185 that notify the state of the traveling vehicle 6 and one second indicator 186 that is provided to include both the above rectangular region in the lit state and the above rectangular region in the unlit state in the captured image. That is, the traveling vehicle 6 according to the first modification includes a plurality of the first indicators 181, 182, 183, 184, and 185 that function as the above-described state notification units, and one second indicator (second indication unit) 186 that functions as the above-described determination reference indicator.

A plurality of the first indicators 181, 182, 183, 184, and 185 switch lighting patterns according to the state of the traveling vehicle 6 in which the first indicators 181, 182, 183, 184, and 185 are provided. Specifically, the first indicators 181, 182, 183, 184, and 185 switch the lighting patterns by the combination of lighting in the five rectangular regions. The switching of the lighting patterns is performed by the control unit 50.

The first indicator 185 is used as a parity. That is, the first indicator 185 is used to ensure that the combination of lighting of the four first indicators 181, 182, 183, and 184 is the lighting pattern intended by the control unit 50.

The lighting states of the second indicator 186 are switched by the control unit 50 to be opposite to that of any one of the first indicators 181, 182, 183, 184, and 185. In the first modification, the lighting states are switched by the control unit 50 to be opposite to that of the first indicator 185, which functions as a parity.

A protrusion protruding in a plate shape from the rear surface 35$a$ of the rear cover 35 may be provided between the first indicator 181 and the first indicator 182. Providing such a protrusion prevents light emitted from one of the first indicator 181 and the first indicator 182 from influencing the other of the first indicator 181 and the first indicator 182. Similarly, a protrusion may be provided between the first indicator 182 and the first indicator 183, between the first indicator 184 and the first indicator 185, between the first indicator 185 and the second indicator 186, between the first indicator 181 and the first indicator 184, between the first indicator 182 and the first indicator 185, and between the first indicator 183 and the second indicator 186. In this case, the same effect can be achieved.

Figure 12:
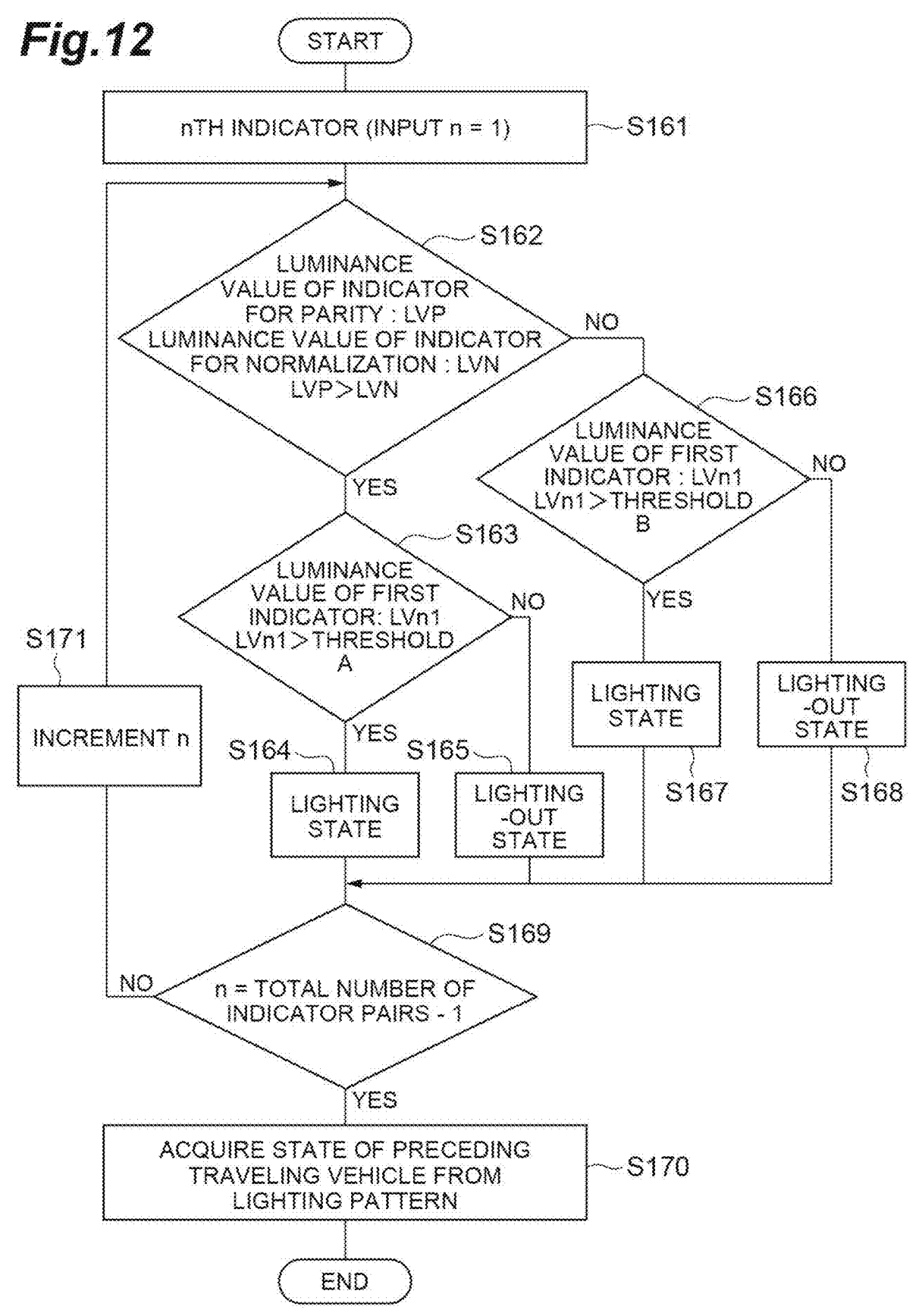

Next, the operation of the preceding traveling vehicle 6A and the following traveling vehicle 6B, for example, when the preceding traveling vehicle 6A accelerates forward upon receiving a transportation command from the traveling vehicle controller 60, is described mainly using FIGS. 7 and 12. When the preceding traveling vehicle 6A accelerates forward, the first indicators 181, 182, 183, 184, and 185 are used to notify the following traveling vehicle 6B that the state of the preceding traveling vehicle 6A itself is in the accelerated state. As illustrated in FIG. 7, specifically, the indicator control unit 55 of the preceding traveling vehicle 6A controls the lighting of the first indicators 181, 182, 183, 184, and 185 so that the lighting pattern indicates that the state of the traveling vehicle 6 is the accelerated state (step S1). The following process from step S2 to step S5 is the same as the above-described preferred embodiments, and the explanation is omitted. The following describes a method of determining the lighting states of the first indicators 181, 182, 183, 184, and 185 and the second indicator 186 in the traveling vehicle 6 and the traveling vehicle system 1 according to the first modification.

The lighting state determination unit 57 determines the lighting states of the first indicator 181 (step S161). The lighting state determination unit 57 compares a luminance value LVP of the first indicator 185 (referred to as indicator for parity in FIG. 12) identified in step S5 (see FIG. 7) with a luminance value LVN of the second indicator 186 (referred to as indicator for normalization in FIG. 12) (step S162). When the lighting state determination unit 57 has confirmed that the luminance value LVP>the luminance value LVN is true (step S162: YES), that is, when the first indicator 185 is in the lit state and the second indicator 186 is in the unlit state, the lighting state determination unit 57 calculates a threshold A to determine the lighting states of the first indicators 181, 182, 183, 184, and 185.

The threshold A is calculated based on the following equation.

$$\text{Threshold } A=(\text{luminance value } LVP-\text{luminance value } LVN)/2+\text{luminance value when first indicator 185 is unlit}+\alpha$$

($\alpha$ is a parameter for adjusting the threshold, which is adjusted as appropriate according to a condition such as the individual differences in luminance of indicators and other conditions. In the first modification, $\alpha=0$ is set.)

The lighting state determination unit 57 compares the luminance value LV11 of the first indicator 181 with the threshold A (step S163). When the lighting state determination unit 57 confirms that the luminance value LV11>the threshold A is true (step S163: YES), the lighting state determination unit 57 determines that the first indicator 181 is in the lit state (step S164). When the lighting state determination unit 57 confirms that the luminance value LV11>the threshold A is not true (step S163: NO), the lighting state determination unit 57 determines that the first indicator 181 is in the unlit state (step S165).

When the lighting state determination unit 57 confirms that the luminance value LVP<the luminance value LVN is true (step S162: NO), that is, when the first indicator 185 is in the unlit state and the second indicator 186 is in the lit state, the lighting state determination unit 57 calculates a threshold B to determine the lighting states of the first indicators 181, 182, 183, 184, and 185.

The threshold B is calculated based on the following equation.

$$\text{Threshold } \beta=(\text{luminance value } LVN-\text{luminance value } LVP)/2+\text{luminance value when the second indicator 186 is unlit}+\alpha$$

($\alpha$ is a parameter for adjusting the threshold, and similarly to the threshold A, it is adjusted as appropriate according to the individual differences in luminance of indicator and other conditions. In the first modification, $\alpha=0$ is set.)

The lighting state determination unit 57 compares the luminance value LV11 of the first indicator 181 with the threshold B (step S166). When the lighting state determination unit 57 confirms that the luminance value LV11>the threshold B is true (step S166: YES), the lighting state determination unit 57 determines that the first indicator 181 is in the lit state (step S167). When the lighting state determination unit 57 confirms that the luminance value LV11>the threshold B is not true (step S166: NO), the lighting state determination unit 57 determines that the first indicator 181 is in the unlit state (step S168).

The lighting state determination unit 57 determines whether the lighting states of all the first indicators 181, 182, 183, 184, and 185, except for the second indicator 186 serving as the indicator for normalization, have been confirmed (step S169). When the lighting state determination unit 57 has not confirmed the lighting states of all the first indicators 181, 182, 183, 184, and 185, the lighting state determination unit 57 increments n entered in step S161 (step S171) and repeats the process from step S162 to step S169. In other words, the lighting state determination unit 57 determines the lighting states of the first indicators 182, 183, 184, and 185.

When the lighting state determination unit 57 has confirmed the lighting states of all of the first indicators 181, 182, 183, 184, and 185 (step S169: YES), the lighting state determination unit 57 identifies the lighting pattern of the first indicators 181, 182, 183, 184, and 185 based on the lighting states of the first indicators 181, 182, 183, 184, and 185. The lighting state determination unit 57 acquires the state (e.g., accelerated state) stored in association with the identified lighting pattern.

In the traveling vehicle 6 and the traveling vehicle system 1 of the first modification, as illustrated in FIG. 11, in addition to the rectangular regions (first indicators 181, 182, 183, 184, and 185) provided to notify the state of the traveling vehicle 6, the rectangular region (second indicator 186) is provided to include both images of the rectangular region in the lit state and the rectangular region in the unlit state in the captured image captured by the following traveling vehicle 6B. Thus, both the rectangular region in the lit state and the rectangular region in the unlit state are always included in the captured image captured by the imager 8, so that the determination of the lit state and the unlit state can be made based on both the rectangular region in the lit state and the rectangular region in the unlit state. As a result, even when a captured image influenced by disturbance light LS or the like is acquired, the lighting states of the rectangular regions can be accurately determined because both the rectangular region in the lit state and the rectangular region in the unlit state under the influence of disturbance light LS or the like can be used as a determination reference to determine the lighting states. In other words, the lighting states of the rectangular regions (first indicators 181, 182, 183, 184, and 185) can be accurately determined even in an environment influenced by disturbance light or the like.

In the traveling vehicle 6 and the traveling vehicle system 1 of the first modification, in a situation where a space in which a rectangular region can be provided is limited on the rear surface 35*a* of the rear cover 35, the lighting states of the first indicators 181, 182, 183, 184, and 185 can be accurately determined with a minimum necessary configuration (i.e., one second indicator 186) even in an environment influenced by disturbance light LS or the like.

Second Modification

The traveling vehicle system 1 and the traveling vehicle 6 according to a second modification may have a configuration including a first indicator including a plurality of rectangular regions that function as state notification units, and a second indicator including two rectangular regions that function as determination reference indicators, which are not illustrated, instead of the configuration of the first modification including the plurality of first indicators 181, 182, 183, 184, and 185 that function as the state notification units and one second indicator 186 that functions as the determination reference indicator. The determination reference indicators of the second modification differ from the determination reference indicator of the first modification in that one rectangular region is always in the lit state and the other rectangular region is always in the unlit state when the traveling vehicle system 1 is in operation (when the power of the traveling vehicle 6 is turned on).

With this configuration according to the second modification, even when a captured image influenced by disturbance light LS or the like is acquired, the lighting states of the rectangular regions can be accurately determined because the rectangular region in the lit state and the rectangular region in the unlit state under the influence of disturbance light LS or the like can be used as a determination reference to determine the lighting states. In other words, the lighting states of the rectangular regions (first indicators) can be accurately determined even in an environment influenced by disturbance light or the like.

Other Modifications

Figure 13A:
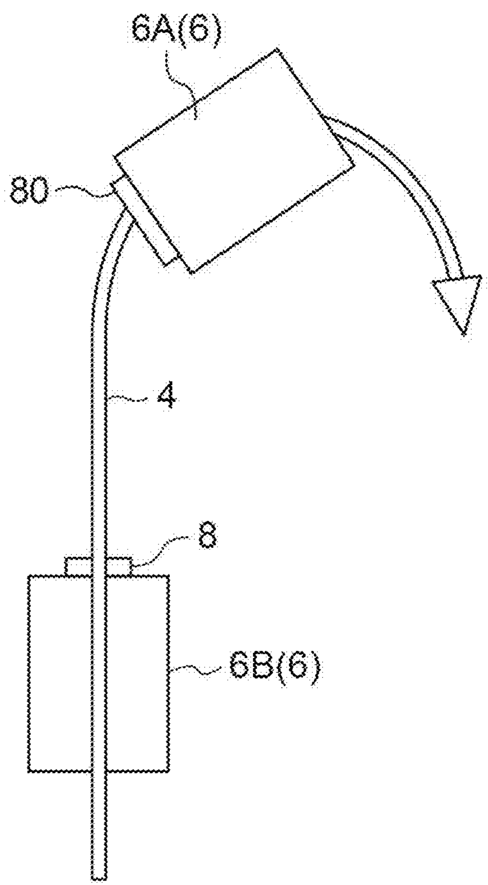
FIG. 13A is a drawing illustrating a following traveling vehicle capturing an image of a preceding traveling vehicle traveling in a curve section.
Figure 13B:
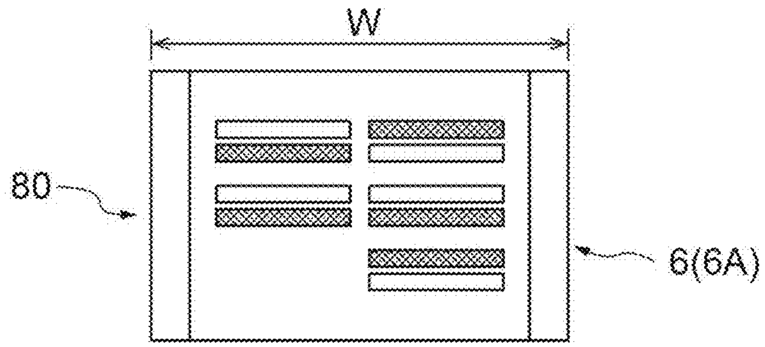
FIG. 13B is a drawing illustrating an example of a captured image.

The above-described preferred embodiments and modifications have been described with an example of determining the lighting states using a captured image captured by the imager 8 as is, but are not limited to this example. For example, as illustrated in FIG. 13A, a captured image captured by the imager 8 of the following traveling vehicle 6B when the preceding traveling vehicle 6A is passing through a curve section has a short size W in the right and left direction in FIG. 13B. In such a captured image, it is not possible to set a plurality of measurement points in the right and left direction as described above. Therefore, the lighting state determination unit 57 may determine lighting states using a captured image processed by magnification in the right and left direction.

The above-described preferred embodiments and modifications have been described with an example in which, as illustrated in FIG. 6, the lighting states of one rectangular region is determined based on the luminance values at a plurality of measurement points, but the lighting states of one rectangular region may be determined based on the luminance value at one measurement point.

The traveling vehicle 6 and the traveling vehicle system 1 of the above-described preferred embodiments and modifications have been described with an example in which the imager 8 is provided, the imager 8 including a lens, and an imaging element or the like that converts light entering from the lens into an electrical signal, the imager 8 having no function of measuring the distance to and from a target object, but the preferred embodiments and modifications are not limited to this example. As the imager 8, a capturing device having a distance measuring function such as a stereo camera, a TOF camera, and the like may be applied.

The above-described preferred embodiments and modifications are described with an example in which the small marker 71 and the large marker 73 are formed as display patterns including shapes in a plurality of colors (for example, AR markers), but they may also be, for example, two-dimensional codes. Examples of the two-dimensional code include a QR code (registered trademark), for example. The above-described preferred embodiments and modifications are described with an example in which the display patterns of the small marker 71 and the large marker 73 are different from each other, but the display patterns may be the same for each other.

The above-described preferred embodiments and modifications are described with an example in which the small marker 71 and the large marker 73 are arranged on the rear surface 35*a* of the rear cover 35, but they need not be arranged.

The above-described preferred embodiments and modifications have been described with an example in which the control unit 50 that controls the traveling vehicle 6 is provided in the body 7 of the individual traveling vehicle 6, but the control unit 50 may be separated from the body 7 and placed at a position where the control unit 50 can perform communication by wire or wirelessly (for example, the traveling vehicle controller 60). In such a case, the control unit 50 may be configured to collectively control a plurality of traveling vehicles 6 instead of being provided for each of the traveling vehicles 6.

The above-described preferred embodiments and modifications have been described with an overhead traveling vehicle as one example of the traveling vehicle, but other examples of the traveling vehicle include an unmanned traveling vehicle, a stacker crane, and the like that travel on a track laid out on the ground or a frame, or a travel path on which a lane marker is provided.

The above-described preferred embodiments and modifications have been described with an example in which the indicator 80 is provided on the rear surface 35*a* of the rear cover 35, but the position at which the indicator 80 is provided is not limited as long as it is a position visible from the following traveling vehicle 6B.

The above-described preferred embodiments and modifications have been described with an example of a configuration (indicator) that switches lighting states by turning a light source on and off as a rectangular region that switches the lighting patterns in accordance with the state of the traveling vehicle 6, but the configuration is not limited to this example. For example, a liquid crystal display screen may be provided on the rear surface 35*a* of the rear cover 35, displaying the rectangular regions as described above and changing the color, brightness, density, pattern, or the like of each rectangular region according to the state of the traveling vehicle 6.

The above-described preferred embodiments and modifications have been described with an example of the indicator 80 including a plurality of rectangular regions, but the indicator 80 may include a circular region, an oval region, or a diamond region, or a combination of these.

The above-described preferred embodiments and modifications have been described with an example in which the state of the traveling vehicle 6, which the following traveling vehicle 6B is notified of, is the accelerated state, but the state of the traveling vehicle may be, for example, the decelerated state, the current position of the traveling vehicle 6, or information such as whether an article 10 is being conveyed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A traveling vehicle to travel along a predetermined travel path, the traveling vehicle comprising:

an indicator with switchable lighting states configured to be switchable;

an imager to capture an image of a preceding traveling vehicle located in front of the traveling vehicle, the captured image including an indicator of the preceding traveling vehicle; and a controller to control traveling of the traveling vehicle based on a determination result of lighting states of the indicator of the preceding traveling vehicle included in the captured image; wherein the indicator of the traveling vehicle includes:

a plurality of first indicators to notify a state of the traveling vehicle; and a plurality of second indicators provided in a same number as a number of the plurality of first indicators and respectively corresponding to the plurality of first indicators; and the plurality of second indicators have lighting states switchable by the controller to be opposite to lighting states of the respectively corresponding plurality of first indicators such that a portion of the indicator of the traveling vehicle is in a lit state and a portion of the indicator of the traveling vehicle is in an unlit state.

2. The traveling vehicle according to claim 1, wherein the controller is configured or programmed to determine the lighting states of the indicator of the preceding traveling vehicle based on a luminance value of a portion corresponding to the indicator of the preceding traveling vehicle in a lit state and a luminance value of a portion corresponding to the indicator of the preceding traveling vehicle in an unlit state in the captured image.

3. The traveling vehicle according to claim 2, wherein the controller is configured or programmed to provide a plurality of measurement points in a portion corresponding to one indicator of the preceding traveling vehicle in the captured image, and based on a plurality of luminance values detected at the plurality of measurement points, calculate a luminance value of the portion corresponding to the one indicator of the preceding traveling vehicle.

4. A traveling vehicle system comprising:

the traveling vehicle and the preceding traveling vehicle according to claim 1;

a track for the traveling vehicle and the preceding traveling vehicle to travel along in a predetermined direction; and a traveling vehicle controller to assign a transportation command to the traveling vehicle and the preceding traveling vehicle.

5. A traveling vehicle system comprising:

the traveling vehicle and the preceding traveling vehicle according to claim 2;

a track for the traveling vehicle and the preceding traveling vehicle to travel along in a predetermined direction; and a traveling vehicle controller to assign a transportation command to the traveling vehicle and the preceding traveling vehicle.

6. A traveling vehicle system comprising:

the traveling vehicle and the preceding traveling vehicle according to claim 3;

a track for the traveling vehicle and the preceding traveling vehicle to travel along in a predetermined direction; and a traveling vehicle controller to assign a transportation command to the traveling vehicle and the preceding traveling vehicle.

* * * * *